United States Patent
Morris

(10) Patent No.: US 7,005,804 B2
(45) Date of Patent: Feb. 28, 2006

(54) AUTOMATIC CARGO COMPARTMENT LIGHTING REACTIVATION SYSTEM

(75) Inventor: Steven E. Morris, Fair Haven, MI (US)

(73) Assignee: General Motors Corporation, Detroit, MI (US)

( * ) Notice: Subject to any disclaimer, the term of this patent is extended or adjusted under 35 U.S.C. 154(b) by 36 days.

(21) Appl. No.: 10/874,115

(22) Filed: Jun. 22, 2004

(65) Prior Publication Data

US 2005/0285444 A1   Dec. 29, 2005

(51) Int. Cl.
*B60Q 7/00*  (2006.01)
*B60Q 1/00*  (2006.01)
*B60L 1/14*  (2006.01)
*G08G 1/04*  (2006.01)

(52) U.S. Cl. .................. 315/84; 307/10.8; 340/943; 362/496

(58) Field of Classification Search .................. 315/77, 315/84; 340/943, 309.16; 307/10.1, 10.8; 362/487–488, 496; B60Q 7/00, 1/00; B60L 1/14; G08G 1/04
See application file for complete search history.

(56) References Cited

U.S. PATENT DOCUMENTS

| | | | |
|---|---|---|---|
| 3,790,933 A * | 2/1974 | Cort .......................... | 180/287 |
| 4,929,925 A * | 5/1990 | Bodine et al. ......... | 340/426.25 |
| 5,713,621 A * | 2/1998 | Krenkel et al. .......... | 296/186.4 |
| 6,152,586 A * | 11/2000 | Dealey et al. .............. | 362/485 |
| 6,209,933 B1 * | 4/2001 | Ang et al. ............... | 292/336.3 |
| 6,480,103 B1 * | 11/2002 | McCarthy et al. ....... | 340/425.5 |
| 6,485,081 B1 * | 11/2002 | Bingle et al. ............ | 340/425.5 |
| 6,621,411 B1 * | 9/2003 | McCarthy et al. ....... | 340/425.5 |
| 6,783,167 B1 * | 8/2004 | Bingle et al. ................. | 296/76 |

* cited by examiner

*Primary Examiner*—Thuy Vinh Tran
(74) *Attorney, Agent, or Firm*—Laura C. Hargitt

(57) ABSTRACT

A light activation system is provided for automatically illuminating a compartment in an automobile. The system comprises a light adapted to illuminate the compartment, a lighting circuit that activates and deactivates the light, and a distance sensor, electrically coupled to the lighting circuit, and adapted to cause the light to be activated when a person is within a predetermined distance from the compartment. A method is also provided for automatically illuminating a compartment in an automobile having a light that is adapted to illuminate the compartment, and a lighting circuit that activates and deactivates the light. The method comprises the step of activating the light when a person is within a predetermined distance from the compartment using a distance sensor that is electrically coupled to the lighting circuit.

22 Claims, 2 Drawing Sheets

AUTOMATIC CARGO COMPARTMENT LIGHTING REACTIVATION SYSTEM

TECHNICAL FIELD

The present invention generally relates to automobile internal lights and lighting assemblies, and more particularly relates to methods and systems for lighting the automobile interior and energy saving devices that manage such methods and systems.

BACKGROUND

Most automobile cabs are equipped with at least one light that illuminates the cab interior. The light allows the automobile occupants to see at night or in a dark environment, and is typically controllable by some sort of switch that an occupant can manipulate when the occupant needs additional lighting. The light is also typically connected to a switch that is automatically turned on when an automobile door is opened in order to provide lighting as an occupant enters or exits the automobile, or when a person is removing cargo from the automobile cab.

In addition to one or more cab lights, most automobiles that have cargo compartments such as trunks equipped with a light to aid a person's vision as they remove their cargo from the compartment. The cargo compartments can typically be opened and closed with a latched door. The cargo compartment light is electrically coupled to a switch that is automatically turned on when the cargo compartment door is opened in order to provide lighting as an occupant removes the cargo from the compartment.

The cargo compartment light switch is also electrically coupled to a timer as a battery saving feature. The timer stops the flow of current to the switch after a predetermined period of time, and consequently deactivates the cargo compartment light. The timer is a valuable feature because people might unload cargo at their destination and then forget to return to the automobile to shut the cargo compartment door. However, the timer can also be a nuisance when a person has too much cargo in the compartment to unload in a single trip. If the timer is set to deactivate the cargo compartment light after a short period, a person will return to the automobile to retrieve a second load, only to be without sufficient lighting to see the cargo that is to be removed.

Accordingly, it is desirable to provide a battery saving system and method for deactivating a cargo compartment light or other interior light to prevent an automobile battery from discharging when an automobile door is left open. In addition, it is desirable to provide a system and method for providing lighting to a person that must intermittently return to the automobile after the battery saving system has caused the light to be deactivated. Furthermore, other desirable features and characteristics of the present invention will become apparent from the subsequent detailed description and the appended claims, taken in conjunction with the accompanying drawings and the foregoing technical field and background.

BRIEF SUMMARY

A light activation system is provided for automatically illuminating a compartment in an automobile. The system comprises a light adapted to illuminate the compartment, a lighting circuit that activates and deactivates the light, and a distance sensor, electrically coupled to the lighting circuit, and adapted to cause the light to be activated when a person is within a predetermined distance from the compartment.

The light activation system according to another embodiment of the invention further comprises a switch electrically coupled to the lighting circuit and adapted to cause the light to be activated when the compartment is opened, and a first timer electrically coupled to the switch and to the lighting circuit and adapted to cause the light to be deactivated after the switch activates the light for a set time.

A method is also provided for automatically illuminating a compartment in an automobile having a light that is adapted to illuminate the compartment, and a lighting circuit that activates and deactivates the light. The method comprises the step of activating the light when a person is within a predetermined distance from the compartment using a distance sensor that is electrically coupled to the lighting circuit.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the use of one or more distance sensors in conjunction with the lighting system in an automobile cargo compartment. It is desirable to have the cargo compartment illuminated while a person is loading or unloading cargo. It is also desirable to allow the person to temporarily leave and then return to the automobile while loading or unloading cargo without worrying whether the cargo compartment lighting remains turned on. Likewise, the person does not typically want to worry about whether the lighting will be turned off when the person is returning to load or retrieve additional cargo, particularly at night or in dark locations such as parking garages. Consequently, coupling one or more distance sensors with the lighting system to illuminate the cargo compartment when a person is near is an ideal way to ensure that a person can always have sufficient lighting when approaching the vehicle and when loading or removing cargo from the cargo compartment.

Figure 1:
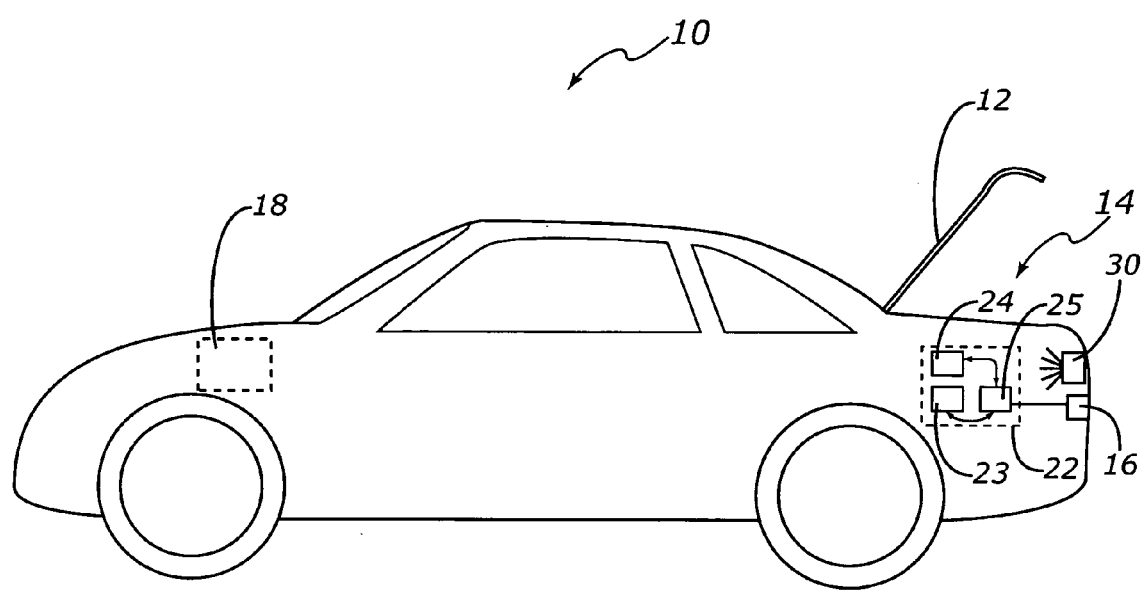
FIG. 1 is a block diagram of an automatic cargo compartment lighting reactivation system in conjunction with a side view of an automobile according to an embodiment of the present invention.

According to an exemplary embodiment of the invention for illuminating a cargo compartment during cargo loading or unloading, FIG. 1, an automobile 10 is equipped with a power source 18 that powers a cargo compartment light 30 as well as a distance sensor 16. The power source 18 is typically the main vehicle battery, but may also be any appropriate type of auxiliary power source. The light 30 is typically disposed inside a cargo compartment 14 such as a trunk, although the light 16 may be installed on the cargo compartment door 12 or any other place in the cargo compartment vicinity from which the light 30 can illuminate the cargo compartment 14.

A number of distance sensors 16 are typically positioned at strategic locations about the automobile, although for the purposes of the present invention it is only necessary to show a distance sensor 16 near the cargo compartment 14. The sensor 16 is suitably coupled to a controller 22 that receives power from the power source 18 when the automobile ignition is turned on, and at least for a predetermined period after the automobile 10 is parked with the ignition system turned off. In an exemplary embodiment of the invention, various alarm actuators (not shown) are suitably coupled to the controller 22, and are used to activate an appropriate combination of visual and/or audible signals when backing up the vehicle to avoid a collision with an object near the automobile 10.

The sensor 16 may be any type of distance detection sensor that is appropriate for use on an automotive vehicle. One type of appropriate distance detection sensor is configured as an ultrasonic device. In order for an ultrasonic device to function as a distance detector, it is generally coupled to an ultrasonic transmitter/receiver (T/R) device 23 that is incorporated into the controller 22 in an exemplary embodiment of the invention, although other embodiments may also be used. The T/R device 122 is typically configured to transmit ultrasonic pulses via the sensor 16, and to receive any return pulses from the sensor 16 that may be reflected from an external object, such as another parked or moving vehicle. A processor 25 is also typically incorporated into controller 22, in conjunction with a memory 24. The processor 25 is typically configured to calculate the distance from the sensor 26 to an external object, and to determine whether or not the external object is changing position, based on the elapsed time between transmission and reflected reception of ultrasonic pulses from the sensor 26.

As will be described in greater detail below, the processor 25 recognizes when a moving object is within a predetermined distance boundary with respect to the vehicle 10. The detection system is conventionally used when parking a vehicle with the automobile transmission in reverse to avoid colliding with another object. In an exemplary embodiment of the invention, the detection system is coupled with the cargo compartment lighting system as illustrated in the block diagram of FIG. 2 and the logic diagram for a lighting circuit of FIG. 3.

Figure 2:
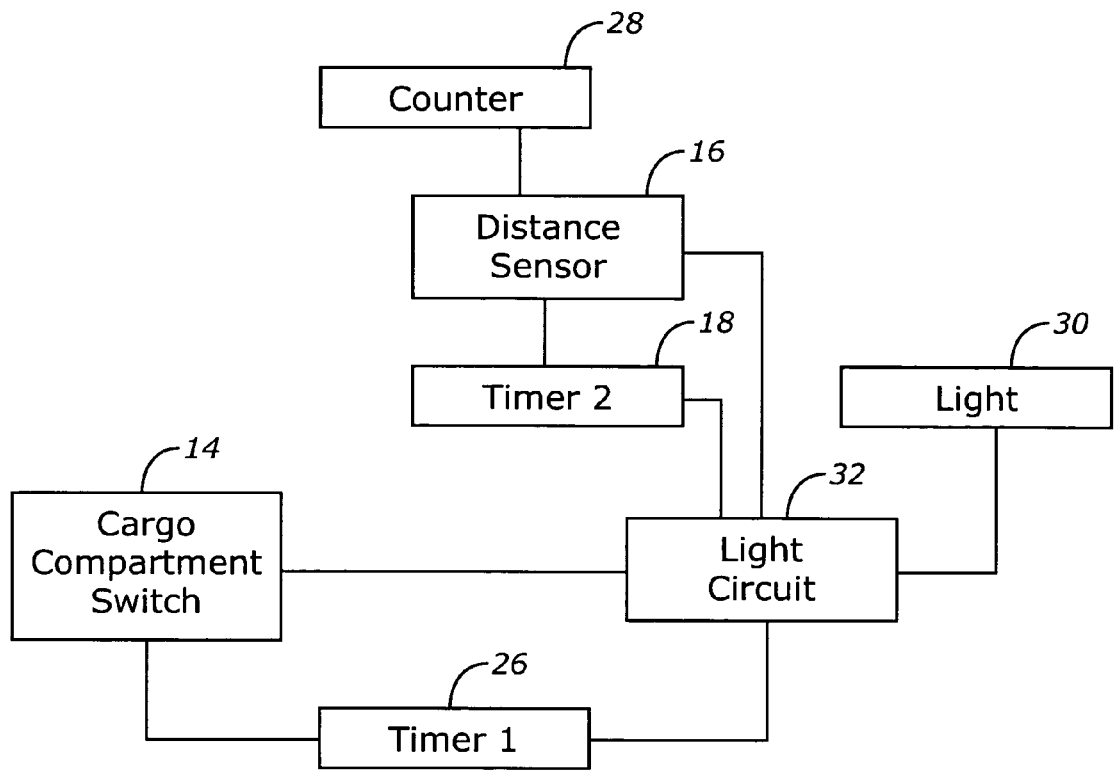
FIG. 2 is a block diagram of an automatic cargo compartment lighting reactivation system including the system's main components according to an embodiment of the present invention.
Figure 3:
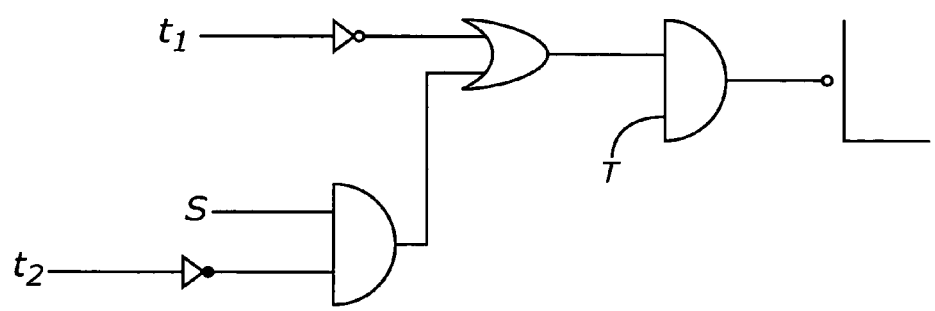
FIG. 3 is a logic diagram of a lighting circuit including the automatic cargo compartment lighting reactivation system main components according to an embodiment of the present invention.

As illustrated in FIG. 2, a switch in the form of a latch or sensor in the trunk or other cargo compartment 14 is electrically coupled to a compartment light circuit 32. In a conventional lighting system, opening the cargo compartment 14 will cause the light 30 to be activated, and closing the cargo compartment will cause the light 30 to be inactivated. A first timer 26 is electrically coupled to the cargo compartment 14 and also to the light circuit 32 and conventionally causes the light to be inactivated if the cargo compartment 14 is left open for a set time period. According to the present invention, the distance sensor 16 is also electrically coupled to the light circuit 32. The distance sensor 16 detects a person approaching the automobile 10 and causes the light 30 to be activated if the person comes within a set radius of the cargo compartment 14.

According to one exemplary embodiment of the invention, the distance sensor 16 continues to monitor a person's presence near the cargo compartment 14 after activating the light 30. When the distance sensor 16 detects that the person has moved beyond the set radius of the cargo compartment 14, the light 30 is inactivated. In another exemplary embodiment, a second timer 18 is electrically coupled to the distance sensor 16 and also to the light circuit 32 and causes the light to be inactivated after the light 30 has been activated by the distance sensor 16 for a set period of time. Preferably, the second timer 18 is reset each time that the distance sensor 16 detects a person within the set radius of the cargo compartment in order to avoid having the light 30 repeatedly activated and inactivated.

Because the cargo compartment 14 is connected to the light circuit 32, opening and closing the cargo compartment can cause the other features to be activated or deactivated. For example, an exemplary embodiment of the invention includes having the light circuit 32 deactivate or stop responding to the distance sensor 16 if the cargo compartment 14 is closed. Preferably, the distance sensor 16 is deactivated when the cargo compartment 14 is closed in order to avoid battery rundown. In another embodiment of the invention the distance sensor 16 functions independent of the cargo compartment's open or closed state. In such an embodiment, even if the cargo compartment 14 fails to activate the light 30, the distance sensor 16 still activates the light 30 when a person moves within the set distance of the cargo compartment 14.

An exemplary logic diagram of the lighting circuit 32 as described above is illustrated in FIG. 3, with T=cargo compartment 14 (switch on), S=distance sensor 16 (on), L=light 30 (on), $t_1$=first timer (timed out) 26, and $t_2$=second timer (timed out) 18. The logic diagram is merely one example, and modifications of the logic diagram can be made within the principles of the present invention.

In another exemplary embodiment of the invention, a counter 28 may be electrically coupled to the distance sensor 16. The counter 28 keeps track of the number of light reactivations by the distance sensor 16. After a predetermined number of reactivations, the counter 28 deactivates the distance sensor 16. The counter 28 eliminates the concern of battery rundown due to false reactivations by the distance sensor 16. Such false reactivations may be caused by a moving shrub or passing vehicles or people, for example.

Although the invention is described primarily with reference to a cargo compartment 14, the same configuration of sensors and timers can be applied to other automobile doors. According to this modification, a person can leave a car door open while loading or unloading loads of cargo without the concern for battery rundown caused by the light being activated while the person is away from the automobile. This and other modifications, as well as the various embodiments of the present invention described above, provide the advantages of illuminating the cargo compartment or other selected area while a person is loading or unloading cargo, and allow the person to temporarily leave and then return to the automobile while loading or unloading cargo without being concerned about whether the area lighting remains turned on. The inventive concept of coupling one or more distance sensors with the lighting system to illuminate the selected area when a person is near the automobile is an ideal way to ensure that a person can always have sufficient lighting when loading or removing cargo from the automobile.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A light activation system for automatically illuminating a compartment in an automobile, the system comprising:
   a light adapted to illuminate the compartment;
   a lighting circuit that activates and deactivates the light;
   a switch, electrically coupled to the lighting circuit, and adapted to cause the light to be activated when the compartment is opened;
   a first timer, electrically coupled to the switch and to the lighting circuit, and adapted to cause the light to be deactivated after the switch activates the light for a set time; and
   a distance sensor, electrically coupled to the lighting circuit, and adapted to cause the light to be reactivated when a person is within a predetermined distance from the compartment.

2. The system according to claim 1, further comprising:
   a second timer, electrically coupled to the distance sensor and to the lighting circuit, and adapted to light to be deactivated after the distance sensor reactivates the light for a set time.

3. The system according to claim 1, wherein the distance sensor is further adapted to cause the light to be deactivated, after reactivating the light, when a person moves beyond the predetermined distance.

4. The system according to claim 1, further comprising:
   a counter, electrically coupled to the distance sensor, and adapted to deactivate the sensor after the distance sensor has reactivated the light a set number of times within a set time period.

5. The system according to claim 1, wherein the distance sensor is also adapted to function when the automobile is moving, and to activate an alerting system when the automobile is moving within a set distance from another object.

6. The system according to claim 5, wherein the distance sensor is configured as an ultrasonic device.

7. The system according to claim 1, wherein the distance sensor is deactivated when the compartment is closed.

8. The system according to claim 1, wherein the distance sensor is further adapted to activate the light independent of light activation by the switch or light deactivation by the first timer.

9. A light activation system for automatically illuminating a compartment in an automobile, the system comprising:
   a light adapted to illuminate the compartment;
   a lighting circuit that activates and deactivates the light; and
   a distance sensor, electrically coupled to the lighting circuit, and adapted to cause the light to be activated when a person is within a predetermined distance from the compartment.

10. The system according to claim 9, further comprising:
    a timer, electrically coupled to the distance sensor and to the lighting circuit, and adapted to light to be deactivated after the distance sensor activates the light for a set time.

11. The system according to claim 9, wherein the distance sensor is further adapted to cause the light to be deactivated, after reactivating the light, when a person moves beyond the predetermined distance.

12. The system according to claim 9, further comprising:
    a counter, electrically coupled to the distance sensor, and adapted to deactivate the sensor after the distance sensor has activated the light a set number of times within a set time period.

13. The system according to claim 9, wherein the distance sensor is also adapted to function when the automobile is moving, and to activate an alerting system when the automobile is moving within a set distance from another object.

14. The system according to claim 13, wherein the distance sensor is configured as an ultrasonic device.

15. The system according to claim 9, wherein the distance sensor is deactivated when the compartment is closed.

16. A method for automatically illuminating a compartment in an automobile having a light that is adapted to illuminate the compartment, and a lighting circuit that activates and deactivates the light, the method comprising the step of:
    activating the light when a person is within a predetermined distance from the compartment using a distance sensor that is electrically coupled to the lighting circuit.

17. The method according to claim 16, further comprising the step of:
    deactivating the light using a timer electrically coupled to the distance sensor and to the lighting circuit after the distance sensor activates the light for a set time.

18. The method according to claim 16, further comprising the step of:
    deactivating the light using the distance sensor when a person moves beyond the predetermined distance.

19. The method according to claim 16, further comprising the steps of:
    counting the number of light activations by the distance sensor within a set period of time using a counter electrically coupled to the distance sensor; and
    deactivating the sensor after the distance sensor has activated the light a set number of times within the set time period.

20. The method according to claim 16, wherein the distance sensor is also adapted to function when the automobile is moving, and to activate an alerting system when the automobile is moving within a set distance from another object.

21. The method according to claim 20, wherein the distance sensor is configured as an ultrasonic device.

22. The method according to claim 16, further comprising the step of:
    deactivating the distance sensor when the compartment is closed.

* * * * *